Nov. 5, 1968

R. L. CHENAULT 3,408,865

FLUID FLOW INDICATING METER

Filed Oct. 13, 1966

Roy L. Chenault
INVENTOR.

BY *Clarence A. O'Brien*
and *Harvey B. Jacobson*
Attorneys

Nov. 5, 1968  R. L. CHENAULT  3,408,865
FLUID FLOW INDICATING METER
Filed Oct. 13, 1966  2 Sheets-Sheet 2

Roy L. Chenault
INVENTOR.

No. 3,408,865
FLUID FLOW INDICATING METER
Roy L. Chenault, Dallas, Tex.
(681 NE. Broadview Drive, Boca Raton, Fla. 33432)
Filed Oct. 13, 1966, Ser. No. 586,550
8 Claims. (Cl. 73—208)

ABSTRACT OF THE DISCLOSURE

A fluid flow indicating meter having a circular cylindrical closed end tube with an open upstream end and a closed downstream end, such tube being mounted in a housing detachably secured in a fluid flow line and being provided with orifice openings through the side wall adjacent the closed end and in which the force resulting from the product of the pressure drop through the orifice openings and the cross-sectional area of the tube is resisted by a spring working within its proportional limit and the area of the orifice openings being varied in proportion to the square root of the deflection of the tube, the spring being on the upstream side of the orifice openings and being completely isolated from the fluid flow stream.

---

An important object of the present invention is to provide a fluid flow indicating meter for operative disposition in a fluid flow line so as to accurately measure and visually indicate to an observer the pressure drop or differential pressure between the upstream and downstream sides of a fluid flow, with the fluid flow indicating meter having an axially displaceable flow indicator mounted in a housing and associated therewith so the displacement of the flow indicator will be accurately proportioned to the flow and visually indicate such flow by correlation of the flow indicator with uniformly spaced graduations on the housing.

Another important object of the present invention is to provide a fluid flow indicating meter which utilizes the combination of a spring working below its proportional limit and a variable orifice arrangement to produce a uniform deflection per unit flow rate increase throughout the range of the meter. Commensurate with such object, a meritorious feature of the present invention resides in the provision of a circular cylindrical closed end tube having an open upstream end and a closed downstream end with orifice openings through the wall of the tube adjacent the closed end and in which the force resulting from the prouct of the pressure drop through the orifice openings and the cross-sectional area of the tube is resisted by a spring working within its proportional limit and the area or the orifice openings varied in proportion to the square root of the deflection, or axial motion, of the tube, the spring being on the upstream side of the orifice opening and being completely isolated from the flow stream.

Another important object of the present invention is to provide a novel fluid flow indicating meter, which is accurate, easily and directly readable, rugged and self-contained and operable in any position without effecting its accuracy.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
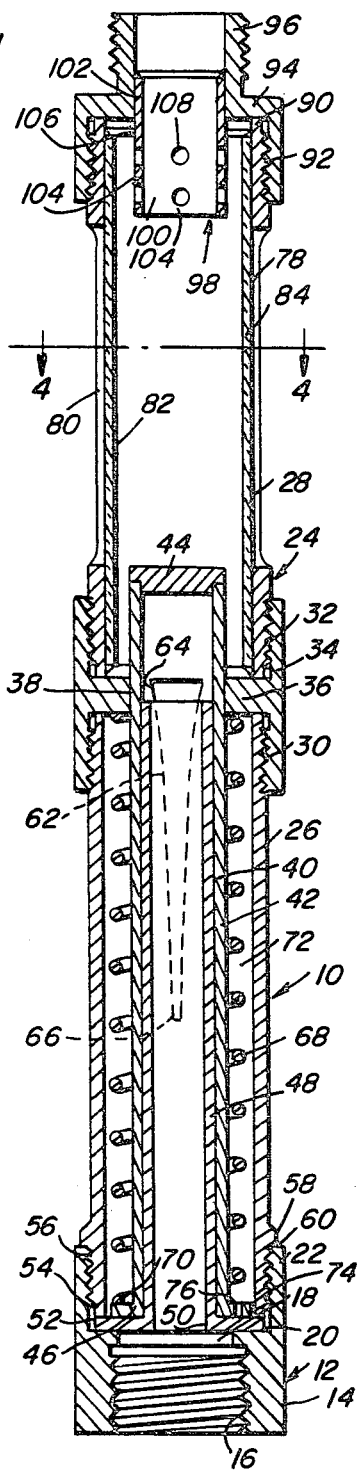
FIGURE 1 is a longitudinal sectional view of a fluid flow indicating meter, constructed in accordance with the present invention and showing the same in position, where there is no flow in the fluid flow line.

Referring now more particularly to the accompanying drawings, the fluid flow indicating meter, generally indicated by the reference numeral 10 is adapted to be axially mounted in a fluid tight and secure manner within a fluid flow line 12. The fluid flow line includes an upstream or inlet nipple 14, which is provided with an internally threaded axial bore 16 to receive one end of the conduit means (not shown) of the fluid flow line with the meter interposed axially in the flow line. The bore 16 is in communication with an inner axial opening 18 in the nipple which opening 18 is defined by a shoulder 20 and the nipple is provided with an axial collar prolongation 22, which is internally threaded.

The meter 10 includes a tubular housing 24, which is composed of two complemental axially aligned sections 26 and 28, the section 26 constituting the upstream section and the section 28 constituting the downstream section. The sections 26 and 28 are provided with adjoining inner end portions 30 and 32 which are exteriorly threaded to receive a connecting or coupling sleeve 34, whereby the end portions are securely and tightly secured together in a fluid tight manner.

The coupling or connector sleeve 34 is provided intermediate its ends with an annular inwardly projecting flange 36, which has a center bore 38 aligned with the axis of the housing, the flange 36 constituting an inner annular closure member for a circular cylindrical tube member 40. The tube member 40 has a cylindrical side wall 42, which is slidably and sealingly disposed through the bore 38 and the downstream end of the tube is closed off by an end wall 44 provided in any appropriate manner, while the upstream end 46 of the tube member is open and is in communication with the opening 18 so that the fluid entering the opening 18 from the conduit means (not shown) connected to the nipple 14 passes directly into the interior of the tube member and acts on the closed downstream end 44 thereof to move the tube member axially.

The cylindrical wall 42 of the tube member 40 is slidably disposed on a fixed cylindrical guide tube 48. The guide tube 48 is provided at its upstream end 50 with an annular, laterally outwardly projecting flange 52 that is seated on the lateral face of the shoulder 20 and held under the end portion 54 of the housing section 26. The end portion 54 of the housing 26 is exteriorly threaded, as at 56, to receive the interiorly threaded prolongation 22 of the nipple 14 and the end portion 54 is provided with an external annular upstream facing shoulder 58 against which the end 60 of the collar prolongation 22 abuts so as to permit tightening of the nipple to the end of the housing section 26 whereby to provide a rigid and leak-proof assembly, without regard to the provision of the flange 52 on the guide tube 48, the flange 52 being retained under the lower end of the lower housing or tube member 40. The tube 48 functions essentially to shut off communication between the interior of the tube 40 and the space 72 by closing any orifice openings below the flange 36. This is necessary to permit the flange 70 to provide adequate damping action when moving within the space 72, as will be described. The flange 70 of the tube 40 serves as a guide and the flange 52 functions to prevent the tube 48 from moving upwardly with the tube 50 with the flange 52 fitting loosely under the lower end of the tube member 40.

Suitable orifice openings 62 are formed in the side wall 42 of the tube member adjacent the closed or downstream end 44 thereof. As shown in FIGURE 1, each of the orifice openings 62 is in the form of a continuous orifice opening, which has a substantially square inner or downstream end 64, adjacent the closed downstream end 44 of the tube member with the orifice opening being elongated and extending axially of the tube member and tapering to a very narrow upstream end 66. The orifice opening 62 is in the nature of a continuous axial slot whose area per unit length increases in proportion to the square root of its length when using the upper end of the orifice as a reference point.

A spring 68 is coiled around the cylindrical wall 42 of the tube member 40 and bears at its inner or downstream end against the flange 36 and at its upstream end against a flange 70, which extends laterally outwardly from the upstream end of the tube member and is annular in formation. The spring is disposed on the upstream end of the tube member and is active to resist the axial movement of the tube member under the flow pressure of the fluid flowing in the fluid flow line through the meter 10.

The tubular wall 42 of the tube member 40 slides freely over the tube 48 and the close clearance between these tubes prevents flow in the flow line from passing through the orifice openings into the space 72, within which the spring 68 is disposed though there exists a slightly loose fit so that any flow into or out of space 72 is restricted but this space 72 will be filled with essentially stagnant fluid to constitute a reservoir.

The flange 70 on the upstream end of the tube member 40 acting in this stagnant fluid reservoir of space serves as an effective dashpot. A dashpot may be unnecessary for a large number of applications where the fluid is supplied at a steady, or gradually changing rate, but is desirable where the meter 10 is used in a hydraulic line, for example, where the flow of the fluid is pulsating, as when the fluid is supplied by a reciprocating pump. Under such conditions, the dashpot action will result in a practically steady indication of the average flow rate to be easily read, as will be explained. The tube 48 functions as a damping tube and the flange 70 is of a slightly lesser cross-sectional area than the internal cross-sectional area or diameter of the housing section 26 so that a clearance 74 is provided therebetween. In addition, a small orifice 76 is formed through the flange 70 in axial alignment with the tube member, the purpose of the clearance and the orifice being to regulate the damping effect, where a damping tube 48 is utilized. The damping effect can be regulated by the clearance 74 and by the size of the orifice 76. As will be pointed out, it is not essential that the damping tube 48 be provided.

The housing section 28 is provided with diametrically opposing, axially extending and elongated openings 78 and 80, which are sealingly closed off by glass or plastic or other transparent and sturdy material defining windows 82 and 84. The exterior surface 86 of the housing section 28 is formed with a series of uniformly spaced graduations 88, which are disposed alongside each of the openings and which are suitably numbered so that the graduations 88 provide a suitable scale which is correlated with the closed downstream end 44 of the inner tube 40 so that the flow rate can be read directly and with equal accuracy throughout the scale range and the scale on the entire meter assembly 10 can be kept to reasonable dimensions with a very wide metering range.

Stop means 98 is provided for the inner slide tube member 40 and includes a relatively short outlet tube 100, which has an end portion 102 suitably fitted within the bore of the nipple 96 and an inner end portion 104 which is coaxially disposed within the outer end of the housing section 28 and which has an open end 104 and a cylindrical circular side wall 106 that is provided with radial openings or apertures 108. The side wall 106 is of a diameter substantially equal to the diameter of the tube member 40 and is provided to limit the sliding movement of the tube member, under high flow rate conditions. The end 44 of the tube member 40 is adapted to abut and close off the inner open end 104 of the stop tube 100 at a point where the end 44 is just beyond the last scale marking and is just beyond the downstream end of the openings 78 and 80. This prevents axial movement of the tube member to a point where the end 44 can block the opening to the adapter or nipple 96 and stop the flow in case the capacity of the meter is exceeded. The radial openings 108 permit some flow even though the metering capacity has been exceeded in order to prevent damage to the meter. In this respect, the stop, in limiting the axial movement of the indicating tube member 40 prevents possible damage to the spring 68 in the instance where it is working near its elastic limit at the rated capacity of the meter. As aforestated, a dashpot action, as provided by the guide tube 48 and the flange 70 on the upstream end of the tube member 40, is not necessary where fluid is supplied at a steady or gradually changing rate. In this regard, the guide tube 48 can be dispensed with and the flange 70 will serve as an adequate guide for the tube member 40 and the flange will not be provided with any orifice or opening.

Figure 2:
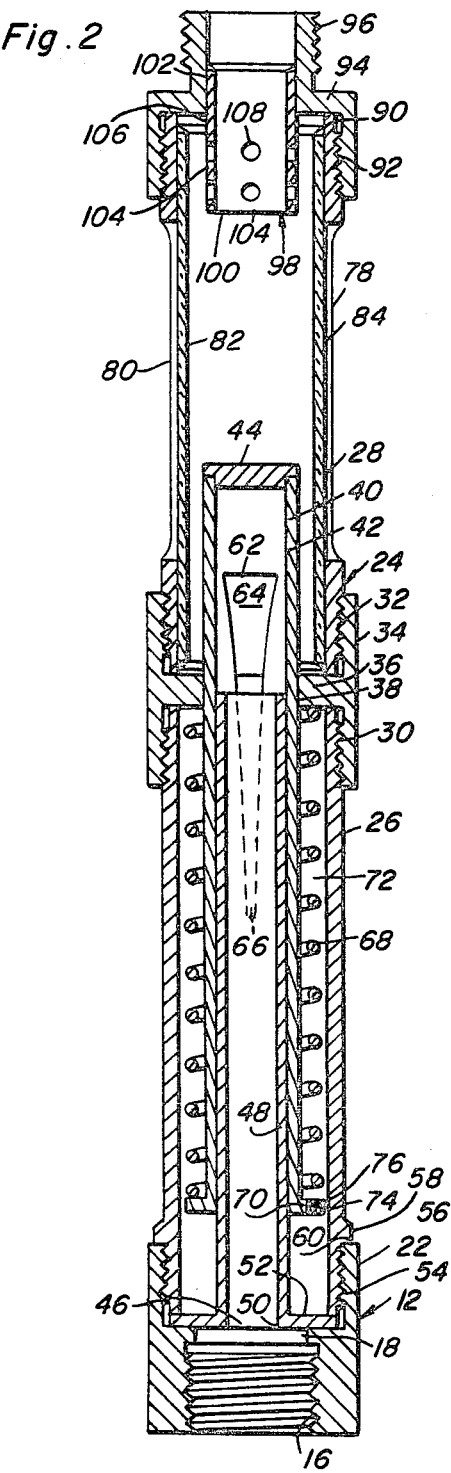
FIGURE 2 is a sectional view, similar to FIGURE 1, but showing the meter in operative position, where there is a flow through the fluid flow line, which flow is measured by the meter.
Figure 3:
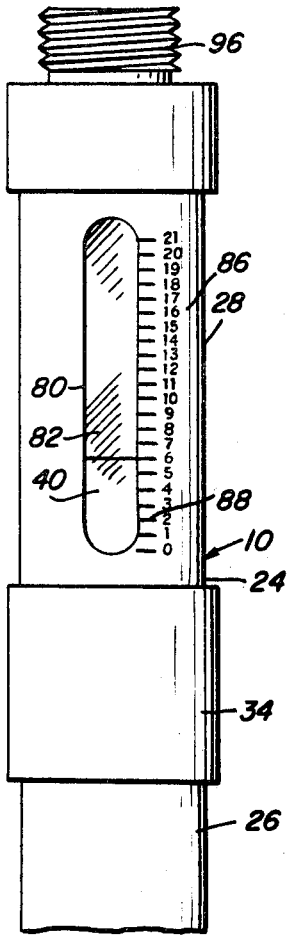
FIGURE 3 is an elevational view of the fluid flow indicating meter, showing in detail the exterior of the housing which is indexed or calibrated with uniformly spaced graduations correlated with the movements of the tube member, which is axially moved in the housing against the resistance of an upstream spring.
Figure 4:
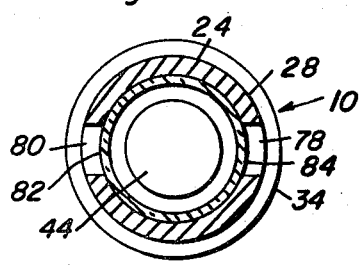
FIGURE 4 is a transverse sectional view, taken substantially on line 4—4 of FIGURE 1.

As can be appreciated, by a comparison of FIGURES 1 and 2, the spring 68 operates on the upstream end of the tube member 40 and, when there is no flow in the fluid flow line, the spring holds the tube member in its seated position, as shown in FIGURE 1. When flow occurs, the tube member 40 will move axially, under the incoming fluid flow pressure which acts on the closed downstream end 44. The spring 68 will be compressed and the fluid flow, depending upon the force or pressure thereof, will move the tube member, exposing the upper portion of the orifice slots 62 above the flange 36 until the pressure drop across the orifice multiplied by the cross-sectional area of the outside diameter of the tube member 40 equals the force exerted by the spring. With the scale 88, as shown in FIGURE 3, the flow rate can be read directly and with equal accuracy throughout the scale range and the scale and entire meter assembly can be kept to reasonable dimensions with a very wide metering range.

In order to maintain a high degree of accuracy in all operating positions, it is desirable to make the tube member 40 as light as possible. Therefore, it is preferably made of a light material and with a thin wall.

Figure 5:
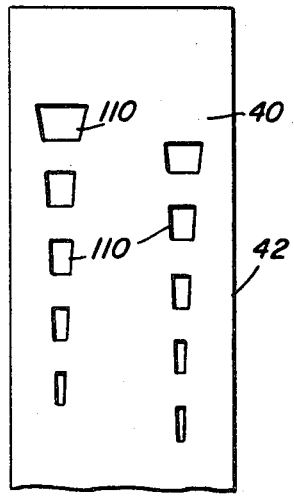
FIGURE 5 is a fragmentary elevational view of a modified form of orifice opening arrangement, and, FIGURE 6 is a fragmentary elevational view of a further modified form of orifice opening arrangement in the tube member.

In this regard, instead of opposing axially extending elongated orifice opening slots 62, the side wall 42 of the tube may be formed with groupings or arrangements of non-circular individual and spaced orifice openings or radial outlet ports 110, the size and shape diminishing from the inner or downstream end of the tube member 40, as shown in FIGURE 5, and the groupings being disposed on diametrically opposite portions of the side wall 42. This arrangement produces the effect of a continuously variable orifice with flow characteristics which stabilize the tube member 40 and reduce friction and the orifice openings 110 do not materially weaken the side wall 42, permitting extremely light thin wall construction. However, it is to be noted that the flange 36 is of a thickness which is equal to the axial extent of each of the orifice openings or outlet ports 110.

Figure 6:
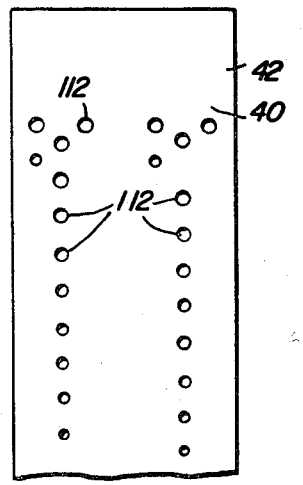

A further modification of orifice opening arrangement is shown in FIGURE 6, wherein a plurality of circular or round radial ports or orifice openings 112 are formed in opposing portions of the side wall 42 of the tube member 40 and are arranged to increase the orifice area in proportion to the square root of the deflection or axial movement of the tube member. This arrangement produces sufficient accuracy for most purposes and is a convenient method of construction for meters to be made in small quantities where the quantities do not justify the production of the more complicated orifice arrangement of FIGURES 1 and 5, which vary exactly in proportion to the square root of the deflection or axial movement of the tube member. The round or circular orifice configuration of FIGURE 6 can be designed to produce exact orifice values for flow rates as indicated by predetermined uniform scale markings. Thus, the circular orifices are grouped around the circumference of the opposing portions of the side walls 42 of the tube member near the downstream or inner end of the tube member where relatively large orifice area per unit deflection or movement of the tube member is required, while substantially inwardly of the inner or downstream end, the circular openings 112 are formed in somewhat axially aligned row fashion, as shown in FIGURE 6.

The meter 10 can be used in various environments and has been found particularly useful for metering gas flow as well as liquid flow by providing a suitable scale to read correctly at a particular pressure.

For some applications, it is preferable to substitute a single heavy wall transparent plastic cylinder for the housing section 28 and transparent walls or liners 82 and 84. However, the construction shown in FIGURES 1 and 3 is preferable where the meter is to be subjected to rough treatment since the transparent walls 82 and 84 are protected by the housing section 28 formed with the relatively narrow slots 78 and 80.

The flow meter 10 is extremely flexible and is readily adaptable to a wide variety of applications. The capacity of the meter can be varied over a wide range by changing the orifice openings of the tube member 40 and by altering the spring 68, that is with regard to its tension, which can be done by change of materials, spacing of the coils, or change in diameter of the coils.

The meter can be accurately employed in water flow systems, such as lawn sprinkling systems to determine the rate of flow through each sprinkler and the time required to apply a given quantity of water over a particular area. The meter can also be used for underground watering application, where no outflow of water is visible, as in underground tree watering.

The meter can also be used in laboratories and manufacturing plants to maintain proper flow rate for cooling water for vacuum pump condensers, water distilling apparatus, chemical stills, chemical blending, check pump delivery and the like. Also, the meter can be used to determine the rate of flow of boiler feed water and its variations and can be successfully employed in oil refineries where indicating the rate of flow of crude oil to stills and refined products from the various refining processes.

Obviously, these are merely some exemplary environmental usages of the meter and it can be appreciated that the same can be used in any fluid flow line, irrespective of the fluid or the particular application or environment of the flow line.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fluid flow indicating meter comprising a tubular housing having opposing inlet and outlet ends for removable attachment thereof in a fluid flow line, a hollow cylindrical tube member having an open upstream end and a closed downstream end and having a side wall, means mounting the tube member for sliding sealing movement in the housing under the force of the fluid flow with the entire flow entering the tube member upstream through the open end and acting on the closed end, said mounting means including an inner annular closure member through which the side wall of the tube member is slidably and sealingly extendable, said side wall being formed with an orifice opening adjacent the closed end for the outlet of the fluid to permit measured passage of the fluid through the housing and the outlet end thereof when the orifice opening or portion thereof is positioned downstream of the inner closure member and resilient means structurally associated with the tube member and disposed in the housing and acting on the tube member to resist the fluid flow opening movements thereof with the force resulting from the product of the pressure drop through the orifice opening and the cross-sectional area of the tube member being resisted by the resilient means functioning within its proportional limit, with the area of the orifice opening varying in proportion to the square root of the axial motion of the tube member, said resilient means including a coil spring disposed around the side wall of the tube member and means mounting the spring at one end on the upstream end of the tube member.

2. The invention of claim 1, wherein the opposite end of the spring bears against the inner closure member.

3. A fluid flow indicating meter comprising a tubular housing having opposing inlet and outlet ends for removable attachment thereof in a fluid flow line, a hollow cylindrical tube member having an open upstream end and a closed downstream end and having a side wall, means mounting the tube member for sliding sealing movement in the housing under the force of the fluid flow with the entire flow entering the tube member upstream through the open end and acting on the closed end, said mounting means including an inner annular closure member through which the side wall of the tube member is slidably and sealingly extendable, said side wall being formed with an orifice opening adjacent the closed end for the outlet of the fluid to permit measured passage of the fluid through the housing and the outlet end thereof when the orifice opening or portion thereof is positioned downstream of the inner closure member and resilient means structurally associated with the tube member and disposed in the housing and acting on the tube member to resist the fluid flow opening movements thereof with the force resulting from the product of the pressure drop through the orifice opening and the cross-sectional area of the tube member being resisted by the resilient means functioning within its proportional limit, with the area of the orifice opening varying in proportion to the square root of the axial motion of the tube member, said resilient means including a coil spring disposed around the side wall of the tube member and means mounting the spring so that it is isolated from the flow stream of the fluid.

4. A fluid flow indicating meter comprising a tubular housing having opposing inlet and outlet ends for removable attachment thereof in a fluid flow line, a hollow cylindrical tube member having an open upstream end and a closed downstream end and having a side wall, means mounting the tube member for sliding sealing movement in the housing under the force of the fluid flow with the entire flow entering the tube member upstream through the open end and acting on the closed end, said mounting means including an inner annular closure member through which the side wall of the tube member is slidably and sealingly extendable, said side wall being formed with an orifice opening adjacent the closed end for the outlet of the fluid to permit measured passage of the fluid through the housing and the outlet end thereof when the orifice opening or portion thereof is positioned downstream of the inner closure member and resilient means structurally associated with the tube member and disposed in the housing and acting on the tube member to resist the fluid flow opening movements thereof with the force resulting from the product of the pressure drop through the orifice opening and the cross-sectional area of the tube member being resisted by the resilient means functioning within its proportional limit, with the area of the orifice opening varying in proportion to the square root of the axial motion of the tube member, said resilient means including a coil spring encircled around the tube member, said tube member adjacent its open upstream end being formed with an outwardly extending annular flange against which one end of the spring bears and said other end of the spring bearing against the closure member.

5. A fluid flow indicating meter comprising a tubular housing having opposing inlet and outlet ends for removable attachment thereof in a fluid flow line, an annular guide flange internally positioned radially in the housing intermediate the ends, said flange having an axial bore aligned with the ends of the housing, a hollow cylindrical tube member having an open upstream end and a closed downstream end and having a cylindrical side wall slidably and sealingly extendable through the bore in said flange, said side wall of the tube member being formed with orifice openings adjacent the closed end for the outlet of fluid to permit measured passage of the fluid through the housing and the outlet end thereof when the orifice openings or portions thereof are positioned downstream of the flange, a coil spring disposed around the tube member and bearing at one end against the upstream side of the flange, said tube member at its open upstream end having an outstanding annular flange, said spring bearing at its outer end on said tube member flange with the coil spring acting on the tube member to resist the fluid flow opening movements thereof with the force resulting from the product of the pressure drop through the orifice openings and the cross-sectional area of the tube member being resisted by the coil spring functioning within its proportional limit with the areas of the orifice openings varying in proportion to the square root of the axial motion of the tube member, a tubular stop member of a cross-sectional area at least equal to the closed end of the tube member, means mounting the tubular stop member axially at the outlet end of the housing and extending axially within the housing and having an open inner end against which the closed end of the tube member is adapted to abut so as to limit the opening axial movement of the tube member under excessive fluid flow conditions and prevent damage to the spring, and said tubular stop member having an apertured side wall to enable a flow from the orifice openings in the tube member into and through the housing outlet end.

6. The invention of claim 5, wherein said annular flange is integral with a connecting sleeve, said connecting sleeve having internally threaded portions on opposite sides of the flange and said housing including tubular upstream and downstream sections having inner externally threaded ends threadingly attached to the sleeve portions which connects the housing sections together.

7. The invention of claim 6, wherein a guide tube is concentrically disposed with the upstream tubular housing section, said section having an upstream externally threaded end portion terminating in an annular end edge, a connector threaded on said threaded end portion, said end portion having an external annular shoulder against which the end of the connector abuts, said guide tube having an annular outstanding flange on its upstream end with said end edge clampingly bearing thereon to clamp it on the connector, said guide tube having an upper end terminating within the bore in the guide flange and said tube member being slidably disposed concentrically on the guide tube and having its orifice openings covered by the guide tube.

8. The invention of claim 7, wherein said flange on the tube member is formed with opening means constituting a damping effect in association with the guide tube, said tube member being radially spaced from the upstream tubular housing section and forming an axial radial space within which a stagnant reservoir of fluid is disposed along with the spring so as to function with the opening means in effecting the damping action.

References Cited

UNITED STATES PATENTS

| | | | |
|---|---|---|---|
| 701,382 | 6/1902 | Patten | 73—208 |
| 2,069,309 | 2/1937 | Henszey | 73—208 |
| 2,244,552 | 6/1941 | Delaney | 73—208 |

FOREIGN PATENTS

| | | |
|---|---|---|
| 325,864 | 9/1920 | Germany. |

RICHARD C. QUEISSER, *Primary Examiner.*

EDWARD D. GILHOOLY, *Assistant Examiner.*